United States Patent
Hou

(10) Patent No.: US 8,564,559 B2
(45) Date of Patent: Oct. 22, 2013

(54) COVER GLASS BUTTON FOR DISPLAY OF MOBILE DEVICE

(75) Inventor: Chih Sheng Hou, Taipei (TW)

(73) Assignee: Universal Cement Corporation, Taipei (TW)

( * ) Notice: Subject to any disclaimer, the term of this patent is extended or adjusted under 35 U.S.C. 154(b) by 100 days.

(21) Appl. No.: 12/975,495

(22) Filed: Dec. 22, 2010

(65) Prior Publication Data

US 2012/0162087 A1   Jun. 28, 2012

(51) Int. Cl.
 *G06F 3/041*  (2006.01)
(52) U.S. Cl.
 USPC .......................................... 345/173; 345/169
(58) Field of Classification Search
 USPC ............. 345/169, 173–178; 178/18.03–18.11
 See application file for complete search history.

(56) References Cited

U.S. PATENT DOCUMENTS

| 8,044,938 B2 * | 10/2011 | Watanabe et al. ............. 345/173 |
| 2005/0083308 A1 * | 4/2005 | Homer et al. ................. 345/173 |
| 2006/0017706 A1 * | 1/2006 | Cutherell et al. ............. 345/173 |
| 2006/0250377 A1 * | 11/2006 | Zadesky et al. ............... 345/173 |
| 2008/0248457 A1 * | 10/2008 | Hosoya et al. ..................... 435/4 |
| 2008/0284745 A1 * | 11/2008 | Kao et al. ...................... 345/173 |
| 2010/0103640 A1 * | 4/2010 | Brown et al. ................. 361/829 |
| 2010/0220065 A1 * | 9/2010 | Ma .................................. 345/173 |
| 2011/0187674 A1 * | 8/2011 | Baker et al. .................... 345/174 |

* cited by examiner

*Primary Examiner* — Hong Zhou
(74) *Attorney, Agent, or Firm* — Lowe Hauptman & Ham, LLP

(57) ABSTRACT

A cover glass pressure-sensitive button for a mobile device is disclosed, a piece of pressure sensor is configured under peripheral of a cover glass for a display of a mobile device. The cover glass can be pressed like a button, and a signal is output from the pressure sensor to trigger a predetermined function for the mobile device when a pressure is applied on the cover glass. In another embodiment, a space is reserved either under the touch panel or under the LCD module. With this configuration, the pressure sensitivity of the cover glass increases because the pressure applied on the cover glass can be fully transferred onto the pressure sensor.

15 Claims, 14 Drawing Sheets

COVER GLASS BUTTON FOR DISPLAY OF MOBILE DEVICE

BACKGROUND

1. Technical Field

The present invention relates to a cover glass pressure-sensitive button for a display of a mobile device, portable media device, or an electronic reader.

2. Description of Related Art

FIG. 1 shows a prior art of a mobile device

An outline of a conventional mobile device is shown as in FIG. 1, a cover glass 201 is mounted on top of a frame 205. An image 20, e.g. a tree, displayed by an underlying LCD can be seen through the transparent cover glass 201.

FIG. 2 shows a section view taken along line AA' of FIG. 1

Through the section view of FIG. 2, it can be seen, within the frame 205, a cover glass 201 is configured on top of the mobile device, a touch panel 202 is configured on bottom of the cover glass 201, and an LCD (liquid crystal display) module is configured on bottom of the touch panel 202. An electronics compartment 204 is configured on bottom of the LCD module 203 for housing additional electronic components. The cover glass 201, touch panel 202, LCD module 203, and electronics compartment 204 are each compactly stacked on top of another.

BRIEF DESCRIPTION OF THE DRAWINGS

FIG. 6B is pressed

DETAILED DESCRIPTION OF THE INVENTION

A pressure sensor is configured under peripheral of a cover glass for a mobile device or similar electronic apparatus. When the cover glass is pressed, the pressure sensor underlay senses the pressure applied on the visible area of cover glass and outputs a signal to trigger a predetermined function through an operation of a control system.

Figure 1:
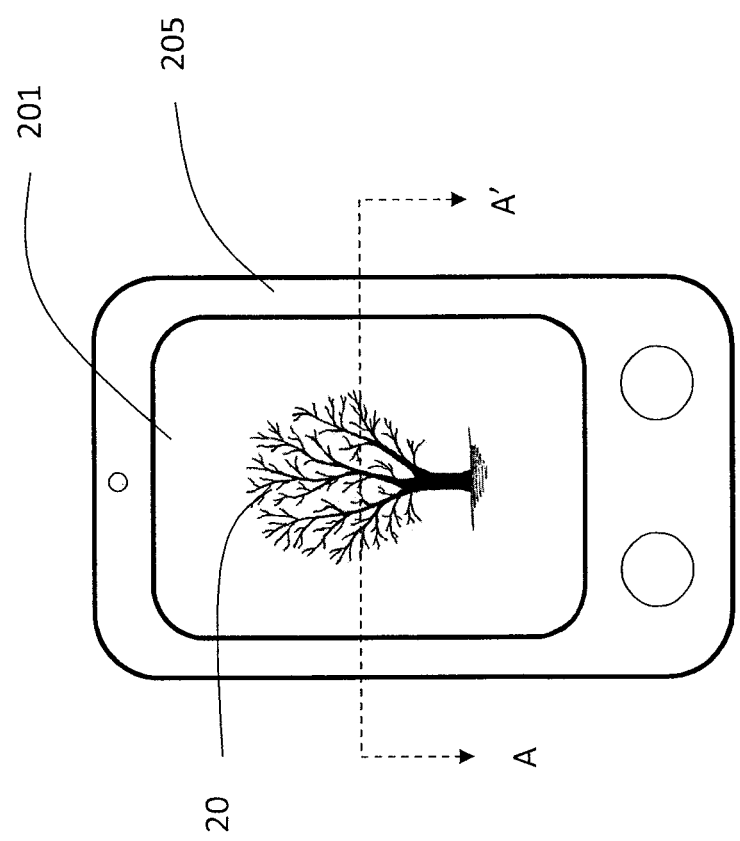
FIG. 1 shows a prior art of a mobile device
Figure 2:
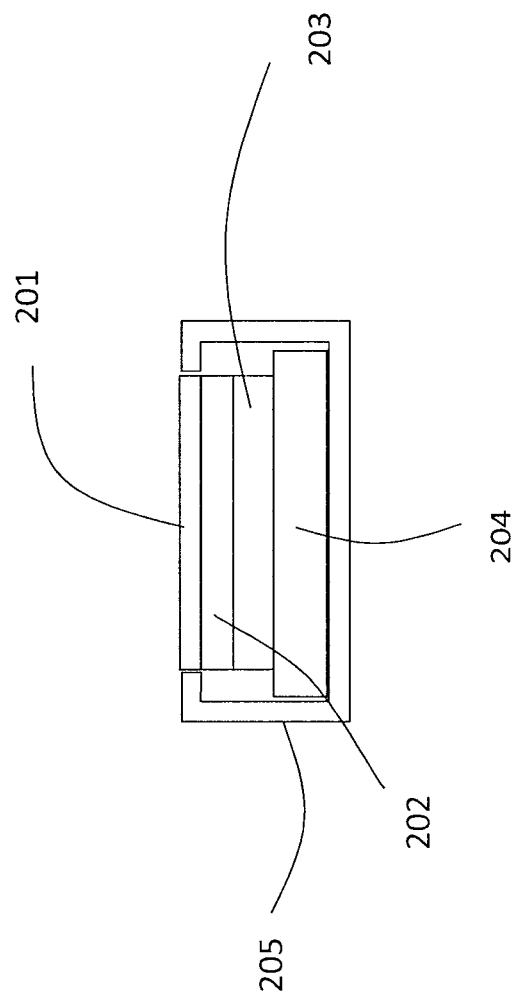
FIG. 2 shows a section view taken along line AA' of FIG. 1
Figure 3:
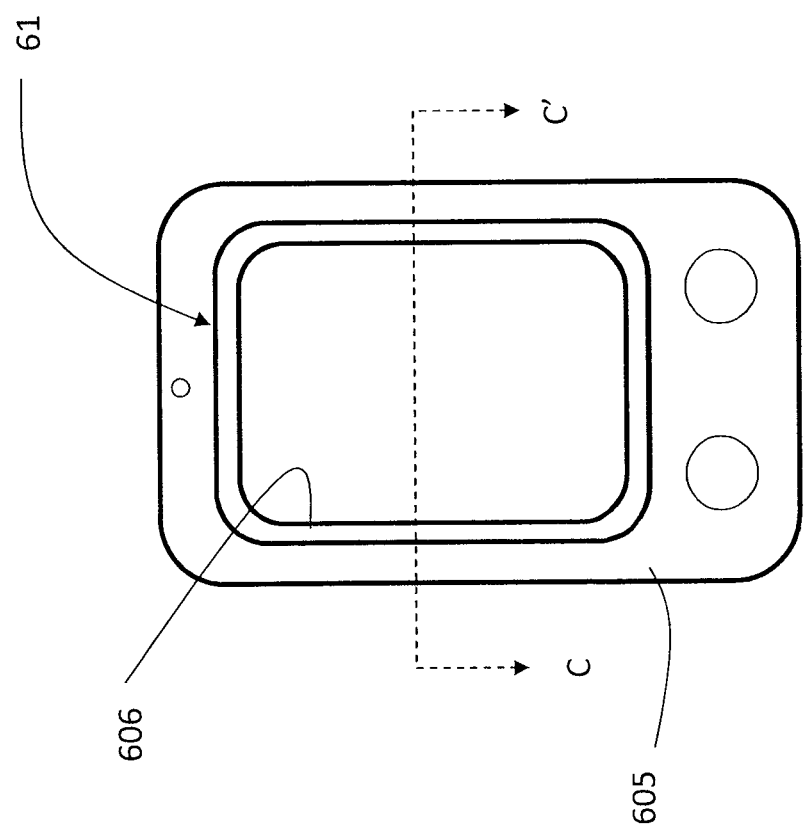
FIG. 3 shows a frame for a mobile device according to a first embodiment of this invention

FIG. 3 shows a frame for a mobile device according to a first embodiment of this invention A frame 605 is a part of a housing for accommodating components of a mobile device. An opening 61 is made on top of the frame 605. A support 606, e.g. a strip of platform, protrudes inward within the opening 61 from the wall of the opening 61.

Figure 4:
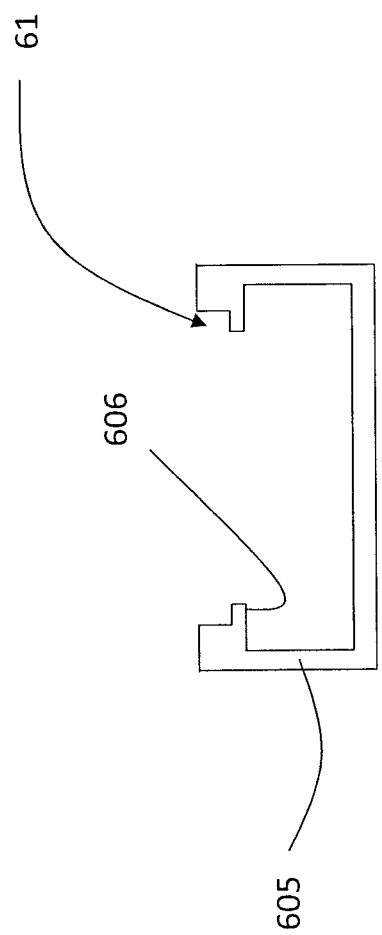
FIG. 4 shows a section view taken along line CC' of FIG. 3

FIG. 4 shows a section view taken along line CC' of FIG. 3

A support 606, e.g. rectangular strip of platform, is formed within the opening 61 on top of the frame 605. The support 606 protrudes inward along a wall bottom of the opening 61 to form an L-shaped support.

Figure 5:
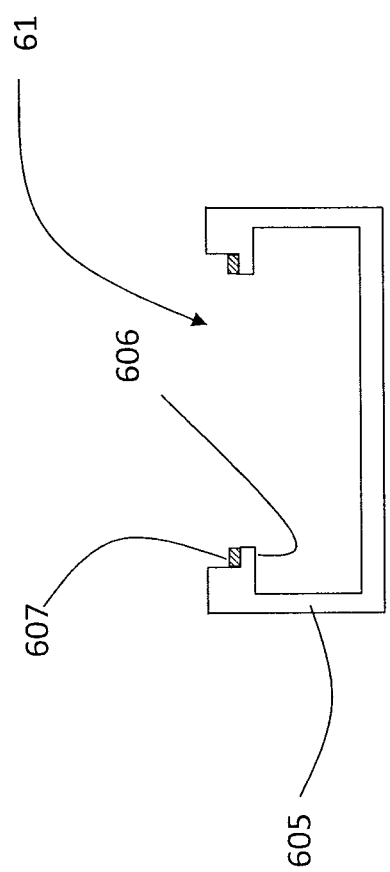
FIG. 5 shows a pressure sensor configured on the support of FIG. 4

FIG. 5 shows a pressure sensor configured on the support of FIG. 4

A strip of pressure sensor 607 is mounted on top of the support 606.

Figures 6B, 6C:
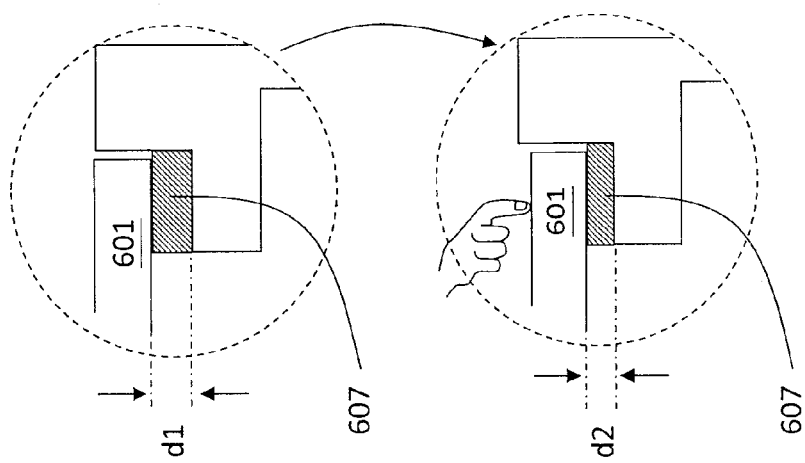
FIG. 6B shows an enlarged view of the circled compartment of FIG. 6A
FIG. 6C shows the cover glass
Figure 6A:
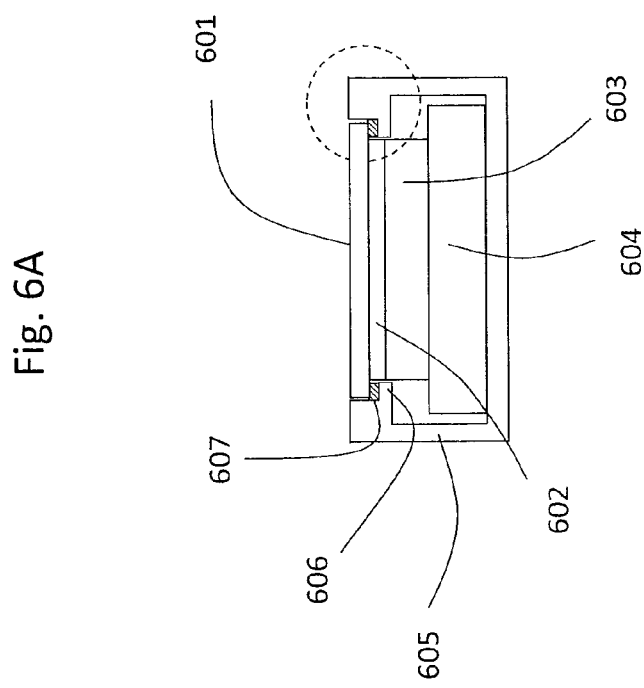
FIG. 6A shows a section view of a mobile device according to this invention.

FIG. 6A shows a section view of a mobile device according to this invention.

FIG. 6A shows that a cover glass 601 is configured on top of the frame 605 and fitted in the opening 61. The top of the cover glass 601 is coplanar with a top of the frame 605. A peripheral of the cover glass 601 is configured on top of the pressure sensor 607. A touch panel 602 is configured on bottom of the cover glass 601 which is sensitive to a touch by a finger or fingers for triggering a predetermined function. An LCD module 603 is configured on bottom of the touch panel 602. Additional electronics are configured in an electronics compartment 604 under the LCD module 603. The cover glass 601, touch panel 602, LCD module 603, and electronics compartment 604 are compactly stacked for miniaturization of the mobile device.

FIG. 6B shows an enlarged view of the circled compartment of FIG. 6A

Due to compressibility of the pressure sensor 607 which underlies along the peripheral of the cover glass 601, the cover glass 601 can be pressed from top of the mobile device to trigger a predetermined function. Therefore the cover glass 601 is capable to function as a pressure-sensitive button. A thickness of d1 for the pressure sensor 607 is shown before the cover glass 601 is pressed.

FIG. 6C shows the cover glass FIG. 6B is pressed

The compressibility of pressure sensor 607 is shown in FIG. 6C, where a thickness of d2 for the pressure sensor 607 is shown after the cover glass 601 is pressed. The pressure sensor 607 shall restore back to its original thickness d1 after the pressure applied over the cover glass 601 is released.

Figure 7:
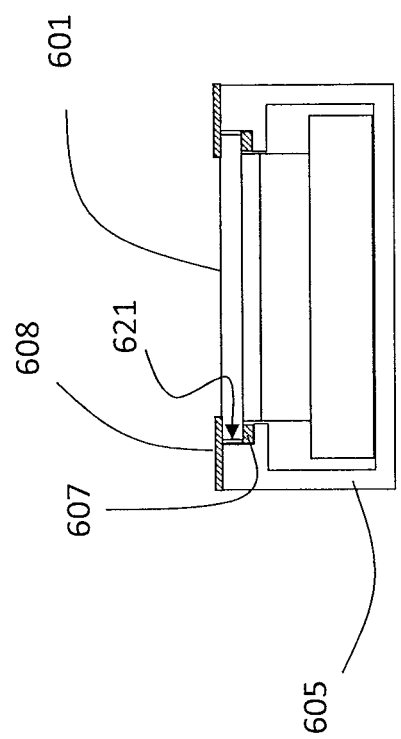
FIG. 7 shows a protective strip covering a slit between the cover glass and the frame.

FIG. 7 shows a protective strip covering a slit between the cover glass and the frame.

A strip of plastic, metal, rubber or glass 608 can be optionally applied as a protective layer to cover the gap 621 formed in between the cover glass 601 and the frame 605 on top of the mobile device.

Figure 8:
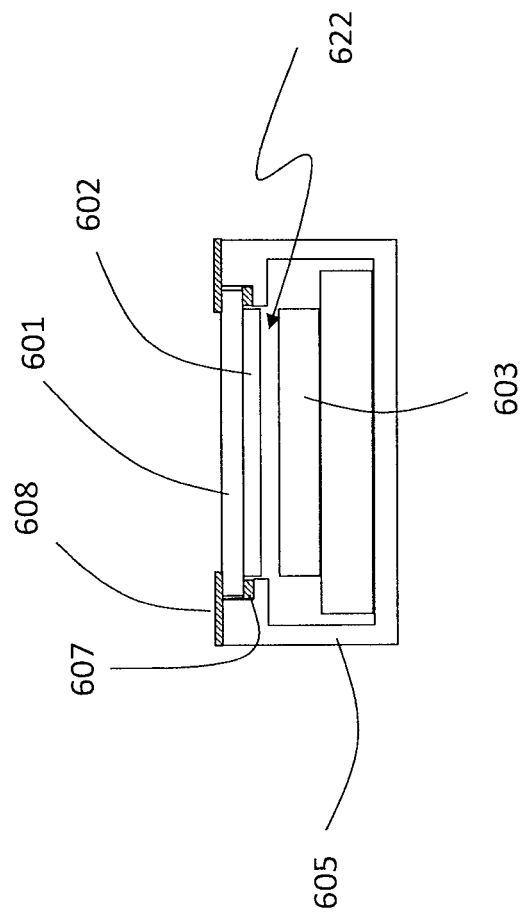
FIG. 8 shows a second embodiment of this invention.

FIG. 8 shows a second embodiment of this invention.

A space 622 is reserved in between the touch panel 602 and the LCD module 603 so that the cover glass 601 in combination of the touch panel 602 is suspended above and free from touching the LCD module 603 below. The mechanical isolation space 622 makes room for the up and down movement of the suspended combination of the cover glass 601 and the touch panel 602 before and after the pressure applied on the cover glass 601, and therefore the pressure applied on the cover glass 601 can be maximally transferred onto the pressure sensor 607.

Figure 9:
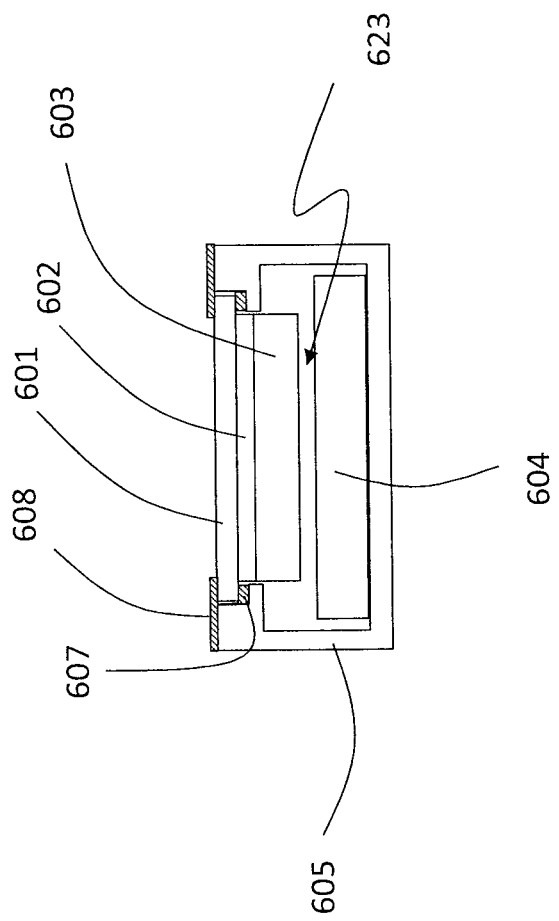
FIG. 9 shows a third embodiment of this invention.

FIG. 9 shows a third embodiment of this invention.

A space 623 is reserved in between the LCD module 603 and the electronics compartment 604 so that the cover glass 601, the touch panel 602, in combination of the LCD module 603 as a whole is suspended above and free from touching the electronics compartment 604 below. The space 623 makes room for the up and down movement of the suspended combination 601, 602, 603 before and after the pressure applied on the cover glass 601, and therefore the pressure applied on the cover glass 601 can be maximally transferred onto the pressure sensor 607.

Figure 10:
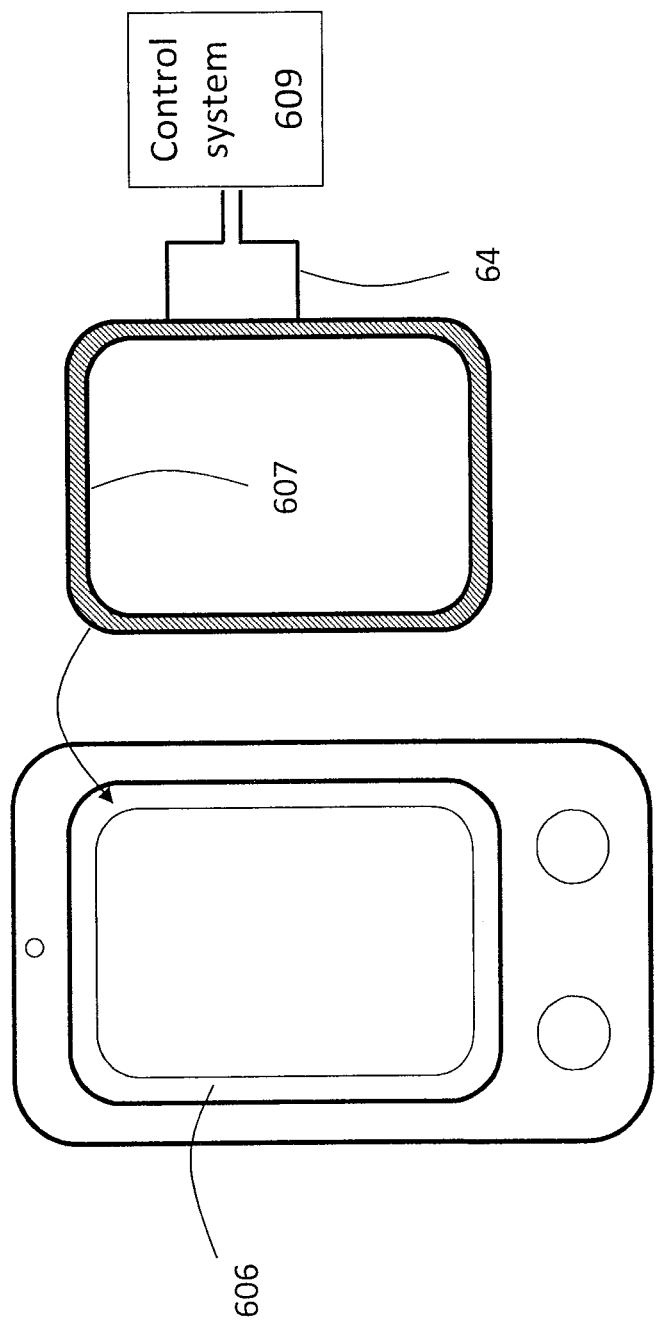
FIG. 10 shows a rectangular strip of pressure sensor is to place on top of the support.

FIG. 10 shows a rectangular strip of pressure sensor is to place on top of the support.

FIG. 10 shows a rectangular strip of pressure sensor 607 is going to be placed on top of the support 606. The pressure sensor 607 electrically couples to a control system 609 through circuits 64. The pressure sensor 607 outputs a signal to the control system 609 corresponding to a pressure applied on the cover glass 601 which is configured over it.

Figure 11:
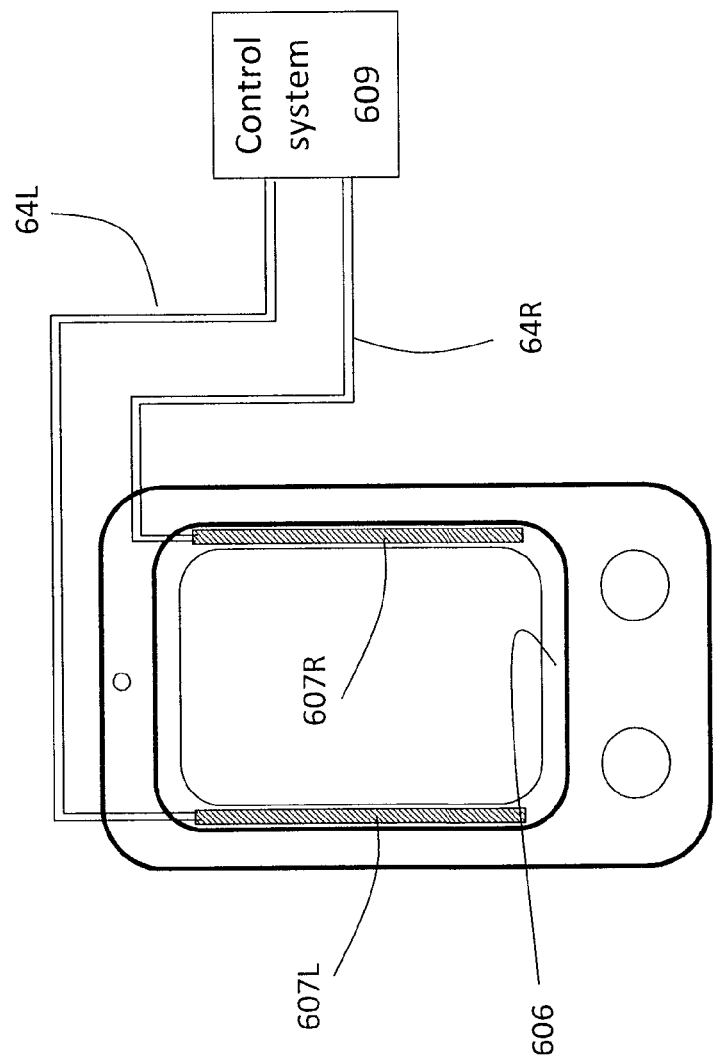
FIG. 11 shows a pair of pressure sensor strips vertically configured on right side and left side of the support.

FIG. 11 shows a pair of pressure sensor strips vertically configured on right side and left side of the support.

FIG. 11 shows a left strip of pressure sensor 607L is mounted on a left platform of the support 606, and a right strip of pressure sensor 607R is mounted on right platform of the support 606. The left strip of pressure sensor 607L electrically couples to the control system 609 through circuits 64L, and the right strip of pressure sensor 607R electrically couples to the control system 609 through circuits 64R.

Figure 12:
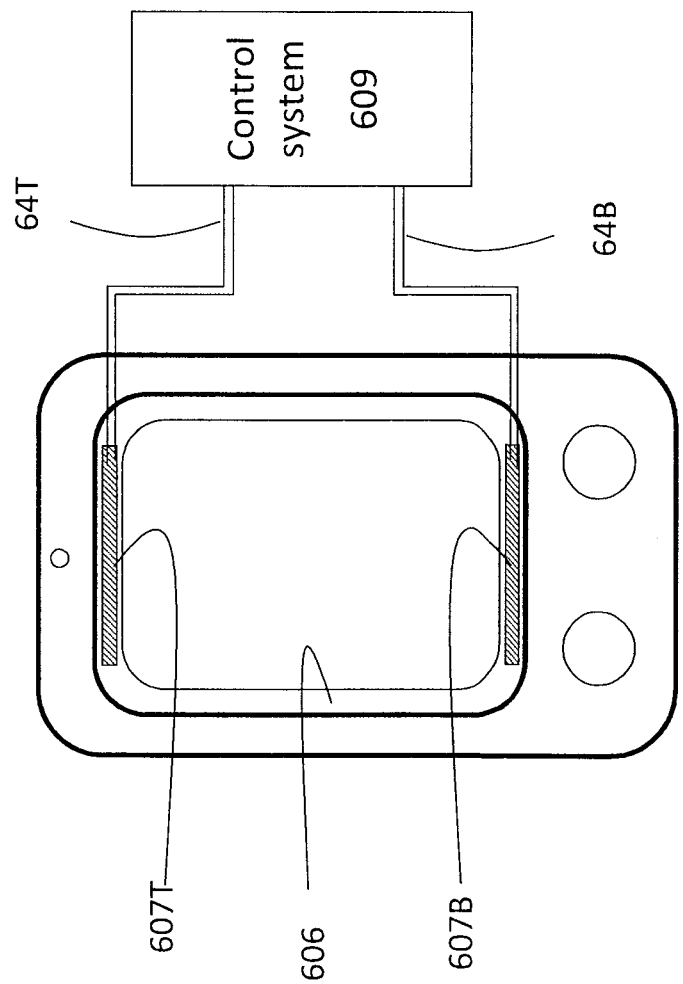
FIG. 12 shows a pair of pressure sensor strips horizontally configured on top side and bottom side of the support.

FIG. 12 shows a pair of pressure sensor strips horizontally configured on top side and bottom side of the support.

FIG. 12 shows a top strip of pressure sensor 607T is mounted on a top platform of the support 606, and a bottom strip of pressure sensor 607B is mounted on a bottom platform of the support 606. The top strip of pressure sensor 607T electrically couples to the control system 609 through circuits 64T, and the bottom strip of pressure sensor 607B electrically couples to the control system 609 through circuits 64B.

Figure 13:
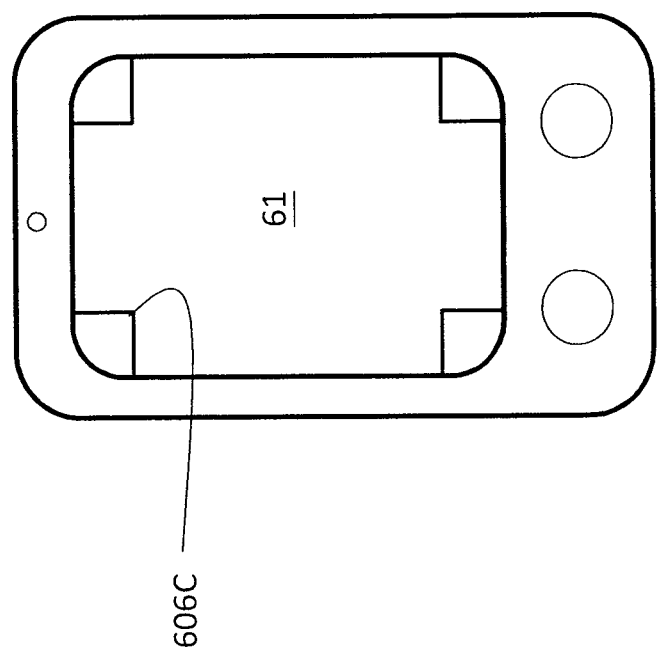
FIG. 13 shows four independent support platforms are configured within the opening

FIG. 13 shows four independent support platforms are configured within the opening FIG. 13 shows four independent support platforms 606C are configured within the square opening 61. Each of the four support platforms 606C is configured on one of the four corners of the rectangular opening 61.

Figure 14:
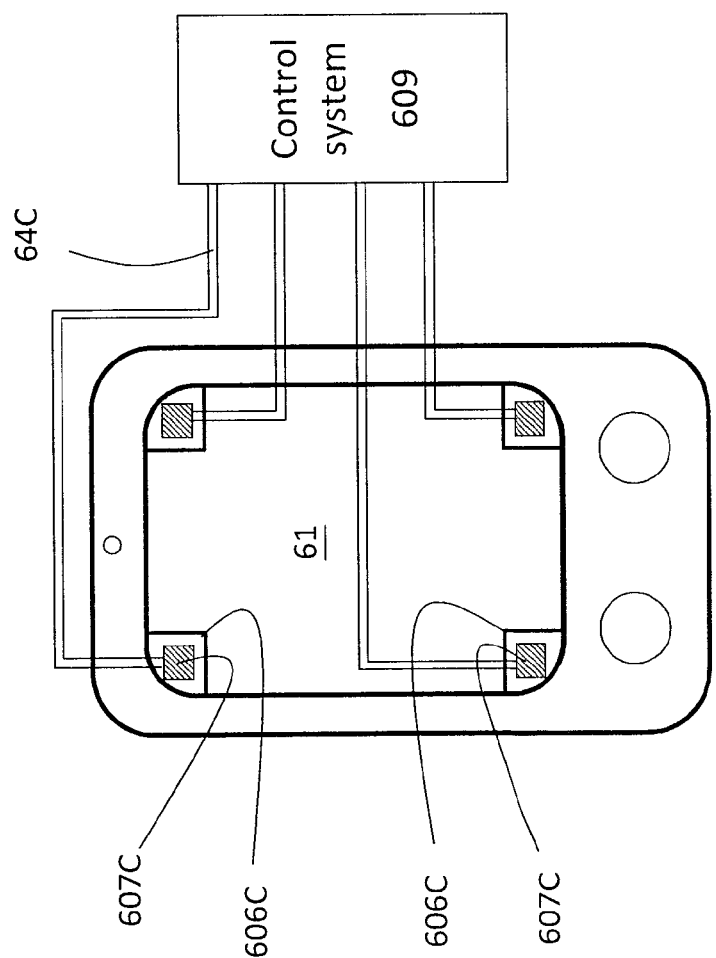
FIG. 14 shows four pressure sensor pads are each configured on one of the support platforms.

FIG. 14 shows four pressure sensor pads are each configured on one of the support platforms.

FIG. 14 shows four pressure sensor pads 607C are provided. Each of the four pressure sensor pads 607C is mounted on one of the four support platforms 606C. Each of the four pressure sensor pads 607C is electrically coupled to the control system 609 through circuits 64C for sensing the pressure applied over the cover glass 601.

While several embodiments have been described by way of example, it will be apparent to those skilled in the art that various modifications may be made without departing from the spirit of the present invention. Such modifications are all within the scope of the present invention, as defined by the appended claims.

What is claimed is:

1. A cover glass button for a mobile device, comprising:
a frame, having a top opening;
a support, protruded inward along a periphery of said top opening;
a pressure sensor, mounted on top of said support; and
a cover glass, configured in said opening and overlying said pressure sensor;
wherein said pressure sensor is configured to output a signal responsive to a pressure applied on said cover glass in a thickness direction of said cover glass;
wherein
said cover glass button further comprises, in said thickness direction:
a touch panel, configured on bottom of said cover glass, and
a display module, configured on bottom of said touch panel;
said touch panel is co-elevational with said pressure sensor;
a space is provided between said touch panel and said display module to make room for up and down movements of said cover glass and said touch panel relative to said display module; and
said touch panel is suspended above and free of contact with said display module.

2. A cover glass button as claimed in claim 1, further comprising, in said thickness direction:
an electronics compartment, configured on bottom of said display module.

3. A cover glass button as claimed in claim 1, wherein said support is protruded inward from a side wall of said frame and spaced upwardly in said thickness direction from a bottom wall of said frame.

4. A cover glass button as claimed in claim 1, wherein said pressure sensor is an annular pressure sensor strip extending continuously along said periphery of said opening.

5. A cover glass button as claimed in claim 1, wherein
said pressure sensor includes two pressure sensor strips arranged along two opposite sides of said opening, respectively, and
said opening further comprises two other sides which are free of said pressure sensor.

6. A cover glass button as claimed in claim 5, wherein said two pressure sensor strips of said pressure sensor are mounted along left and right sides of said opening, respectively.

7. A cover glass button as claimed in claim 5, wherein said two pressure sensor strips of said pressure sensor are mounted along upper and lower sides of said opening, respectively.

8. A cover glass button as claimed in claim 1, wherein said pressure sensor includes four independent pressure sensor pads, each configured at one of the four corners of said opening.

9. A cover glass button as claimed in claim 1, further comprising:
a protective layer, configured on top of said frame to cover a gap between said cover glass and said frame.

10. A cover glass button as claimed in claim 9, wherein said protective layer is made of plastic, metal, rubber or glass.

11. A cover glass button as claimed in claim 1, wherein said pressure sensor is compressible to have a reduced thickness in response to a pressure applied on said cover glass in said thickness direction, and
said pressure sensor is restorable to an original thickness thereof in response to a release of the pressure.

12. A cover glass button for a mobile device, comprising:
a frame having a top opening;
a support protruding inward of said top opening and arranged along a periphery of said top opening;
a pressure sensor mounted on top of said support; and
a cover glass configured in said opening and overlying said pressure sensor;
wherein said pressure sensor is sandwiched, in a thickness direction of said cover glass, between said cover glass and said support;
wherein said cover glass button further comprises, in said thickness direction and within said frame, a touch panel below said cover glass and a display module below said touch panel; and
wherein the touch panel does not overlap the pressure sensor in the thickness direction;
wherein a space is provided between said touch panel and said display module to make room for up and down movements of said cover glass and said touch panel relative to said display module; and wherein said touch panel is suspended above and free of contact with said display module.

13. A cover glass button as claimed in claim 12, further comprising, in said thickness direction and within said frame:

an electronics compartment below said display module.

14. A cover glass button as claimed in claim 12, wherein said pressure sensor is compressible to have a reduced thickness in response to a pressure applied on said cover glass in said thickness direction, and said pressure sensor is restorable to an original thickness thereof in response to a release of the pressure.

15. A mobile device, comprising:

a frame having a top opening;

a support protruding inward of said top opening and arranged along a periphery of said top opening;

a pressure sensor mounted on top of said support;

a transparent cover configured in said opening and overlying said pressure sensor;

a touch panel below said transparent cover;

a display module below said touch panel; and a circuit;

wherein a space is provided between said touch panel and said display module to make room for up and down movements of said transparent cover and said touch panel relative to said display module;

wherein said touch panel is suspended above and free of contact with said display module;

wherein said pressure sensor is sandwiched, in a thickness direction of said transparent cover, between said transparent cover and said support, is electrically coupled to the circuit, and is configured to output a signal responsive to a pressure applied on said transparent cover in said thickness direction; and wherein the touch panel has an outer peripheral edge spaced inwardly from an outer peripheral edge of the transparent cover, and also spaced inwardly from an inner peripheral edge of the support.

* * * * *